United States Patent
Storm et al.

(10) Patent No.: US 10,167,600 B2
(45) Date of Patent: Jan. 1, 2019

(54) PARTICLE REMOVING ARRANGEMENT FOR AN ELECTRIC VEHICLE

(71) Applicant: VOLVO TRUCK CORPORATION, Gothenburg (SE)

(72) Inventors: Jonas Storm, Hisings Backa (SE); Sassan Etemad, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 347 days.

(21) Appl. No.: 14/915,024

(22) PCT Filed: Oct. 1, 2013

(86) PCT No.: PCT/EP2013/002935
§ 371 (c)(1),
(2) Date: Feb. 26, 2016

(87) PCT Pub. No.: WO2015/048979
PCT Pub. Date: Apr. 9, 2015

(65) Prior Publication Data
US 2016/0222616 A1    Aug. 4, 2016

(51) Int. Cl.
*E01H 8/10* (2006.01)
*B60L 5/40* (2006.01)

(52) U.S. Cl.
CPC ............... *E01H 8/105* (2013.01); *B60L 5/40* (2013.01)

(58) Field of Classification Search
CPC .................................. E01H 8/10; E01H 8/105
(Continued)

(56) References Cited

U.S. PATENT DOCUMENTS 2,516,600 A *  7/1950  Shipley .................... E01H 8/10
                                                    104/279
8,763,774 B2 *  7/2014  Asplund ................... B60L 5/40
                                                    104/243
(Continued)

FOREIGN PATENT DOCUMENTS

DE          30 05 080 B1    11/1980
EP          2653614 A2  *  10/2013  ............. E01H 1/005
(Continued)

OTHER PUBLICATIONS

International Search Report (dated Jun. 5, 2014) for corresponding Intenrational App. PCT/EP2013/002935.

Primary Examiner — Zachary L Kuhfuss
(74) Attorney, Agent, or Firm — WRB-IP LLP (57) ABSTRACT

A particle removing arrangement is adapted to remove particles from the upper contact surface of an electric rail in an electric highway by the use of an airflow, where the particle removing arrangement is arranged in front of a current collector of a vehicle, where the particle removing arrangement includes an inlet opening for inlet of air and an outlet opening for outlet of air, where the inlet opening is directed in a forward direction and the outlet opening is directed in a sideway to rearward direction in relation to the driving direction of the vehicle, and where the particle removing arrangement creates a particle removing airflow from a forward movement of the vehicle. Particles can be removed from an electric rail without the use of an external power source. The particles can also be removed in a contact-less manner, such that there is no friction or abrasion between the particle removing arrangement and the electric rail.

16 Claims, 4 Drawing Sheets (58) Field of Classification Search
USPC ............................................... 104/279; 291/1
See application file for complete search history.

(56) References Cited

U.S. PATENT DOCUMENTS

| | | | | |
|---|---|---|---|---|
| 8,776,970 B2 * | 7/2014 | Asplund | ................... | B60L 5/40 |
| | | | | 191/29 R |
| 8,875,857 B2 * | 11/2014 | Asplund | ................... | B60L 5/40 |
| | | | | 191/22 C |

FOREIGN PATENT DOCUMENTS

| | | | | |
|---|---|---|---|---|
| FR | 2 914 611 A1 | 10/2008 | | |
| WO | WO-0044992 A1 * | 8/2000 | ............... | E01H 8/00 |
| WO | 03/104016 A | 12/2003 | | |
| WO | WO-2009145468 A2 * | 12/2009 | ......... | B01D 46/0021 |
| WO | 2011/123048 A1 | 10/2011 | | |
| WO | WO-2017182428 A1 * | 10/2017 | .............. | B61F 19/00 |

* cited by examiner

PARTICLE REMOVING ARRANGEMENT FOR AN ELECTRIC VEHICLE

BACKGROUND AND SUMMARY

The present invention relates to a particle removing arrangement adapted to remove particles in front of a current collector on an electric vehicle. The particle removing arrangement is suitable for electric vehicles and hybrid vehicles having a rechargeable battery.

The share of partly or only electrically driven vehicles is expected to increase radically in the next 10 to 20 years. Such vehicles are normally referred to as electric vehicles and hybrid vehicles. This also means a corresponding increase in the need to charge such vehicles. In principle, the charging is done by connecting the vehicle to the electrical network, either directly to one of the ordinary outlets used for other equipments, or through a special charger, external to the vehicle. Charging current is transferred from the network to a battery on board the vehicle.

The battery of the electric vehicle may be charged with a relatively low current over a relatively long time period, e. g. over night. Such vehicles are referred to as plug-in vehicles and are common for hybrid vehicles which are provided with a battery having a relatively low capacity, such that the distance that the vehicle can travel on electric power is limited. When the battery is empty, or when additional power is required, the combustion engine is started. High current charging of plug-in vehicles is also possible. Since the vehicle is charged one or two times a day, a specific connector is used to connect the vehicle to the current source.

The use of a connector for charging the vehicle is possible for vehicles that are not used very often, such as passenger cars. In such a case, the vehicle may be charged at home over night and at work during daytime.

For vehicles that require charging several times a day, such as commercial vehicles, a connection by using a plug is not an efficient alternative. Instead, various types of current collectors are proposed, which are connected to an external current supply means when the vehicle is stopped, such as a bus at an end stop. This will work for vehicles that have a lot of planned stops at specified positions, such as city buses or delivery trucks.

This is however not a solution for vehicles driving long distances, such as long haul trucks or long distance busses. It is proposed to arrange "electric highways" where a vehicle can connect to a current supply when driving. One possibility is to use overhead current collectors that connect to an overhead wire system. Another possibility is to apply contact rails in the surface of the road, where current collectors of the vehicle slide against the upper surfaces of the contact rails. Two rails are positioned side by side in order to provide two electric poles. It would also be possible to combine the two, by using one overhead electric wire and one electric rail. In such a system, the overhead wire would supply the voltage and the electric rail would be the ground or neutral pole.

One problem with electric rails embedded in the road surface is to keep the upper surface clean from water, dirt, leaves, gravel and other particles in order to provide a good contact between the electric rail and the current collector. Larger objects, such as stones, dead animals etc. can be removed by the use of a plough-like member in front of the current collector, preferably at the front of the vehicle. Such a plough-like member must however ride at a small distance above the road surface and is thus not suited to remove smaller objects like water or small stones etc. having a size of less than 1-2 centimeters. Small objects will decrease or break the contact between the electric rail and the current collector and they may also damage the current collector, since the vehicle may travel with a high speed.

There are different solutions for the removal of smaller objects from an electric rail. One solution is to direct a pressurized air flow to the upper surface, where the pressurized air is provided by an air compressor driven e. g. by the engine of the vehicle. Such a solution consumes a fair amount of energy. Another possibility is to use a plough or brush in sliding contact with the electric rail. Such solutions will be subjected to wear and need constant maintenance. One solution would be to use contact brushes as current collectors, but such a solution is not adapted for higher currents.

WO 2003/104016 shows a current track embedded in the road surface. The current tracks are provided with grooves in which current pick-ups of a motor vehicle are guided at the same time as current is collected. The current pick-up may be provided with a plough and a nozzle in order to remove dirt. The plough is positioned directly in front of the current pickups. A small nozzle is also positioned directly in front of the current pick-ups and is arranged to direct the airflow downwards and forwards into the current grooves. In this way, the dirt will accumulate in front of the current pick-ups in the current groove. This solution may work for small amounts of dirt because some part of the flow jet may diffuse sideways.

There is thus a need for an improved particle removing arrangement.

It is desirable to provide an improved particle removing arrangement for a current collector of an electric vehicle.

In a particle removing arrangement according to an aspect of the invention adapted to remove particles from the upper contact surface of an electric rail comprised in an electric highway by the use of an airflow, where the particle removing arrangement is arranged in front of a current collector of a vehicle, where the particle removing arrangement comprises an inlet opening for inlet of air and an outlet opening for outlet of air, the inlet opening is directed in a forward direction and the outlet opening is directed in a sideway to rearward direction in relation to the driving direction of the vehicle, and in that the particle removing arrangement creates a particle removing airflow from a forward movement of the vehicle.

By this first embodiment of the particle removing arrangement according to the invention, the particle removing arrangement is adapted to create a particle removing airflow where the outlet opening is directed in a sideway to rearward direction in relation to the driving direction of the vehicle. In this way, the airflow is directed such that the airflow directs the dirt away from the electric rail. In this way, the dirt will not accumulate in front of the current collector, which will improve the reliability of the electrical connection between the electric rail and the current collector. This is advantageous since each electric interruption in the electrical connection will cause a disruption in the charging of the vehicle battery and may also cause an electric arc which may damage the contact surfaces.

The particle removing arrangement may be positioned close to the current collector and may be arranged on the current collector sub-frame, such that the particle removing arrangement will follow the alignment of the current collector in a sideway direction, and also when the current collector is raised to an idle position. The particle removing arrangement may also be positioned at a distance in front of the current collector. In one example, the particle removing arrangement is arranged at the front of the vehicle, close the bumper and the current collector is arranged at the rear of the vehicle, at the rear axle of the vehicle. In another example, the particle removing arrangement and the current collector are both arranged next to the front axle of the vehicle.

In a development of the particle removing arrangement, the particle removing arrangement is provided with a first low, active position where it is positioned adjacent the upper contact surface of the electric rail. In this position, the particle removing arrangement will remove dirt form the upper surface of the electric rail. The particle removing arrangement is further provided with a second idle position in which the particle removing arrangement is raised upwards from the first, lower position. In this position, the particle removing arrangement will not remove any dirt from the electric rail. This position is preferably used when the vehicle is driving on a road that is not provided with an electric rail. This position may also be used if several vehicles travel after each other, and the first vehicle uses a particle removing arrangement. In this case, the electric rail has been cleaned by the first vehicle.

In one embodiment, the particle removing airflow is a blowing airflow, which is directed towards the upper surface of the electric rail. The inlet opening is directed forwards and the outlet opening is directed sideways to rearwards, i. e. in a direction between 90 and 180 degrees in relation to the driving direction of the vehicle. The inlet opening is larger than the outlet opening, such that a funnel-shape is obtained. The funnel-shape will collect the incoming airflow and will accelerate the airflow to an airflow having a higher speed.

In another embodiment, the particle removing airflow is a suction airflow, where the particle removing arrangement comprises a particle inlet positioned above the upper contact surface of the electric rail. In this way, dirt will be sucked from the upper surface of the electric rail by the particle inlet, functioning with an ejector effect. The flow channel of the particle removing arrangement preferably comprises an area reduction of the flow channel at the particle inlet in order to increase the ejector effect. In one example, the area of the inlet opening is the same as the area of the outlet opening. In this way, the energy loss through the particle removing arrangement will be minimized. The outlet opening is preferably directed away from the upper contact surface of the electric rail such that the outlet air flow is not directed towards the electric rail. The outlet opening may be positioned sideways of the upper contact surface of the electric rail, offset in a sideway direction with regards to the inlet opening, with the outlet opening directed rearwards. In this way, the outlet air flow and the particles are blown out at the side of the upper contact surface. The outlet opening may also be directed sideways with an angle to the travelling direction of the vehicle such that the outlet air flow is directed away from the upper contact surface of the electric rail.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims.

Figure 1:
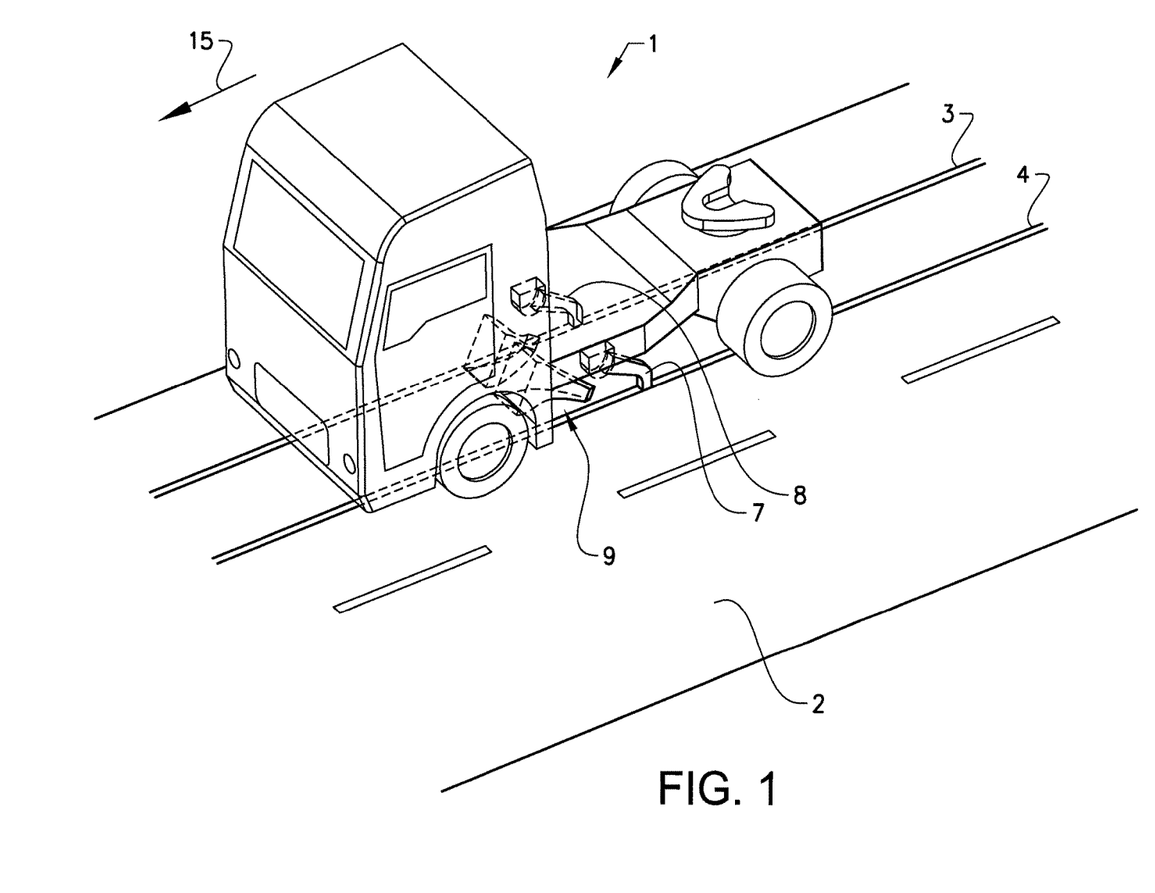
FIG. 1 shows a schematic vehicle having two current collectors each provided with a particle removing arrangement.

FIG. 1 shows a schematic vehicle 1 having two current collectors 7, 8, where each is provided with a particle removing arrangement 9. The vehicle 1 is travelling along a road 2 having two electric rails 3, 4 embedded in the road surface. The upper surfaces of the electric rails are aligned with or protrude somewhat from the road surface. Preferably, the upper surface extends from the road surface by at least one centimeter such that the upper surface of the electric rail will always be above the road surface, even after ageing of the mad and the electric rails. This in turn ensures that the current collectors of the vehicle will not bear against the road surface when they bear against the upper surfaces of the electric rails. Further, water and other contaminations will not collect on the upper surfaces of the electric rails if they protrude from the road surface. The current collectors are preferably guided sideways such that they can follow and align with the electric rails by the use of sensors and servomotors in a known way.

The vehicle is provided with two current collectors 7, 8 which are adapted to bear on the upper surfaces of the electric rails, thereby allowing a current to flow from the electric rails to the vehicle through the current collectors. The current can be used to power the vehicle and/or to charge the battery of the vehicle. The current collectors are lowered towards the electric rails when the vehicle enters a road provided with electric rails and are arranged to slide against the upper surfaces of the electric rails with a specified pressure such that a reliable contact force between the current collectors and the upper surfaces of the electric rails is provided. The current collectors may also be controlled by the driver of the vehicle.

The vehicle is further provided with two particle removing arrangements 9 positioned in front of the current collectors. A particle removing arrangement may be mounted on a support structure of a current collector. In this way, the particle removing arrangement will easily follow the current collector when it is adjusted in a sideway direction. The particle removing arrangement will in this case also be raised when the current collector is raised. The particle removing arrangement may also be suspended on an own support. structure. The width of the particle removing arrangement may be designed such that a sideway adjustment is not necessary.

The particle removing arrangement is further provided with a first active position where it is positioned adjacent the upper surface of an electric rail. In this position, the particle removing arrangement will remove dirt from the upper surface of the electric rail. The particle removing arrangement is further provided with a second idle position in which the particle removing arrangement is raised upwards from the first, lower position. This position is preferably used when the vehicle is driving on a road that is not provided with an electric rail. This position may also be used if several vehicles travel after each other, and the first vehicle uses a particle removing arrangement. In this case, the electric rail has been cleaned by the first vehicle. In the idle position, the particle removing arrangement is further protected from damage when the vehicle travels on uneven roads.

Figures 2, 3:
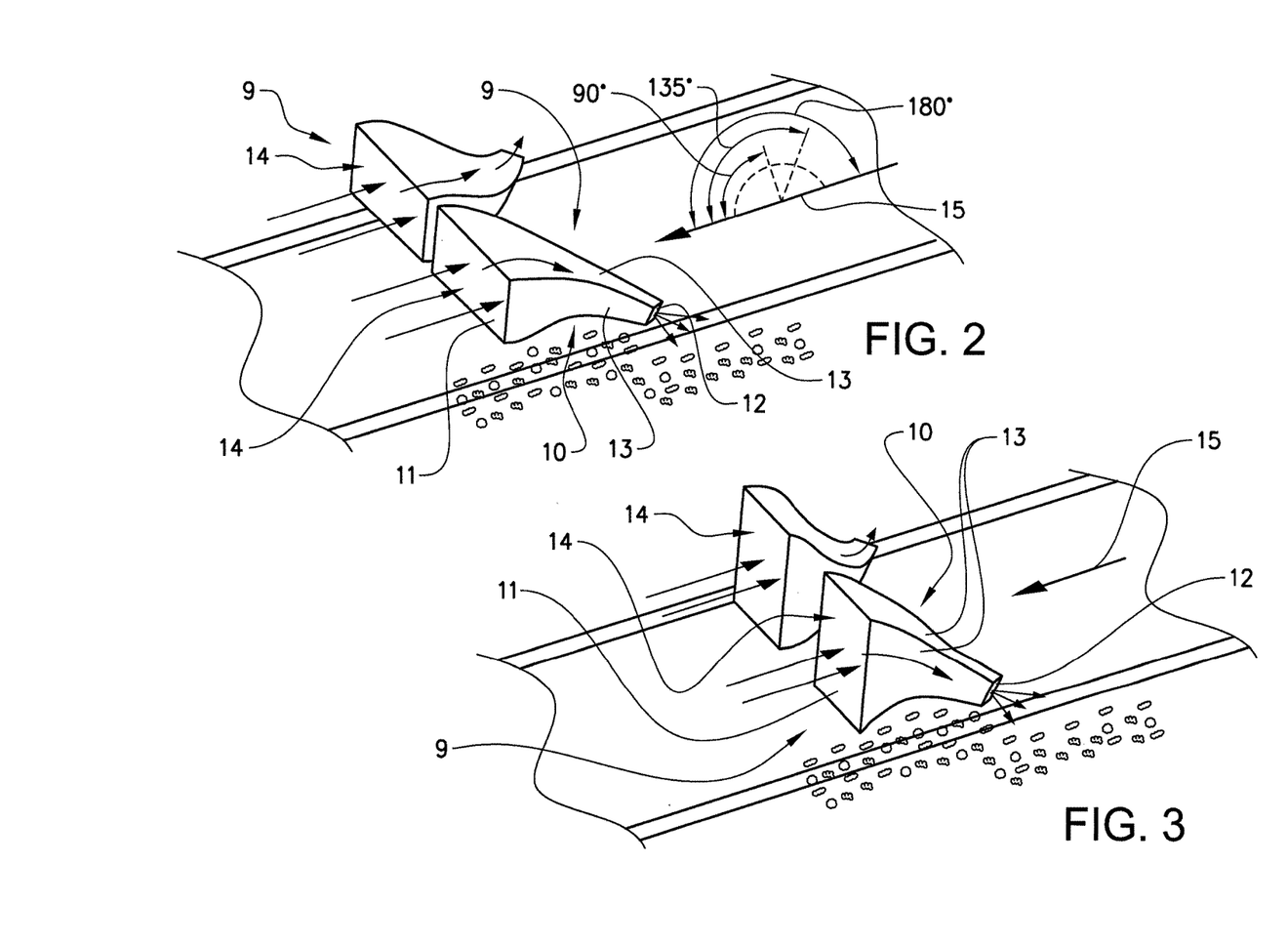
FIG. 2 shows a first embodiment of a particle removing arrangement according to the invention
FIG. 3 shows a development of the first embodiment of the particle removing arrangement according to the invention.

FIGS. 2 and 3 show a first embodiment of a particle removing arrangement according to the invention. Only one of the particle removing arrangements is described. In this embodiment, the particle removing airflow is a blowing airflow, which is directed towards the upper surface of the electric rail. The particle removing arrangement 9 is in this embodiment shaped as a funnel 10 and is provided with an inlet opening 11 directed forwards and an outlet opening 12 directed sideways to rearwards, i. e. in a direction between 90 and 180 degrees in relation to the driving direction of the vehicle. An arrow 15 shows the driving direction of the vehicle. Outer walls 13 delimit the flow channel 14 of the particle removing arrangement.

In this embodiment, the inlet opening 11 is larger than the outlet opening 12, such that a funnel-shape is obtained. The funnel-shape will collect the incoming airflow and will accelerate the airflow to an airflow having a higher speed. The ratio between the area of the inlet opening and the area of the outlet opening is preferably in the range between 4 and 10. The inlet opening is directed forwards such that the airflow from the travelling vehicle enters the inlet opening more or less straight. The inlet opening is preferably positioned at the front of the vehicle, e. g. underneath the front bumper or is integrated in e. g a wheel house. The efficiency of the particle removing arrangement is enhanced if the incoming airflow is undisturbed.

The outlet opening 12 is directed in a sideway direction. A preferred angle with respect to the driving direction is between 90 and 135 degrees, i. e. perpendicular to the electric rail or up to 45 degrees to the rear from this direction. In this way, the dirt will be blown off the upper surface of the electric rail and to the side before a current collector reaches the same position. The airflow is further preferably directed in a downward direction towards the upper surface of the electric rail. The particle removing arrangement is preferably positioned somewhat above the upper surface of the electric rail, such that it will be at a safe distance from hitting the road. The airflow is thus preferably directed downwards with an acute angle, preferably between 10 and 45 degrees from a horizontal plane, such that the outlet air flow is directed towards the upper contact surface of the electric rail.

The shape and size of the particle removing arrangement may vary. The material of the particle removing arrangement may be plastic, metal or rubber or a combination of more than one material. The particle removing arrangement may be stiff and rigid, or may be somewhat flexible and may also be foldable such that it will fold together when not in use. In FIG. 2, a particle removing arrangement having an inlet opening that is low and wide is shown, and in FIG. 3, a particle removing arrangement having an inlet opening that is high and narrow is shown. The shape of the particle removing arrangement is preferably adapted to the available space at the vehicle.

Figure 4:
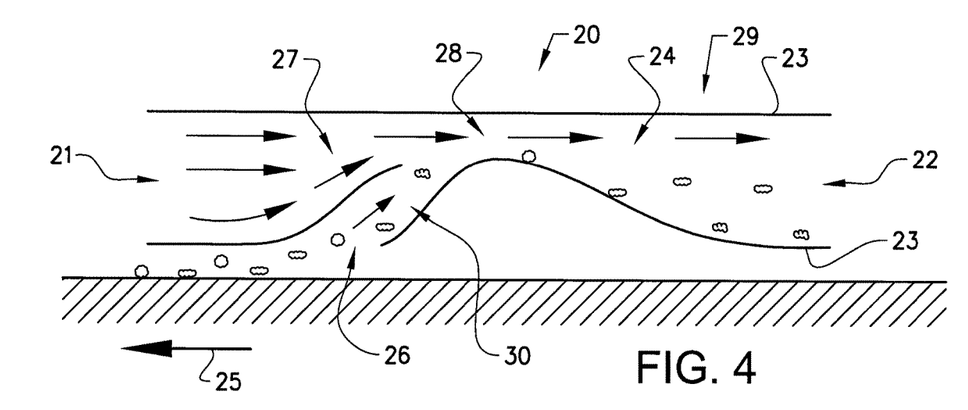
FIG. 4 shows a side view of a second embodiment of a particle removing arrangement according to the invention.
Figure 5:
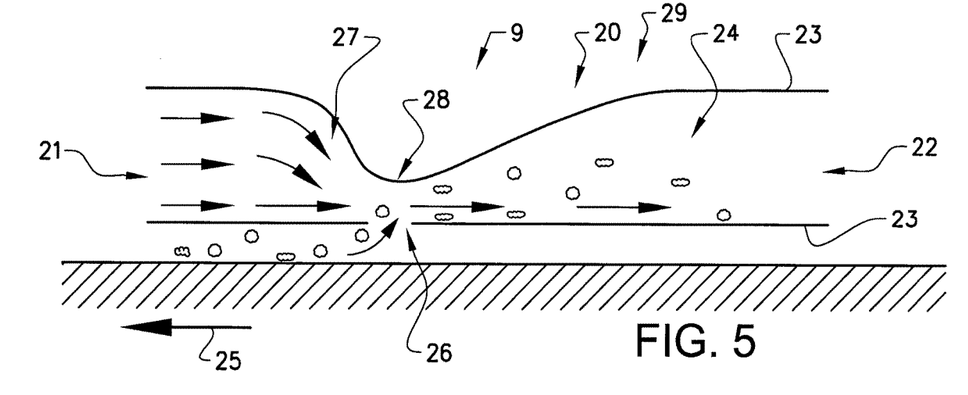
FIG. 5 shows a development of the second embodiment of a particle removing arrangement according to the invention.
Figure 6:
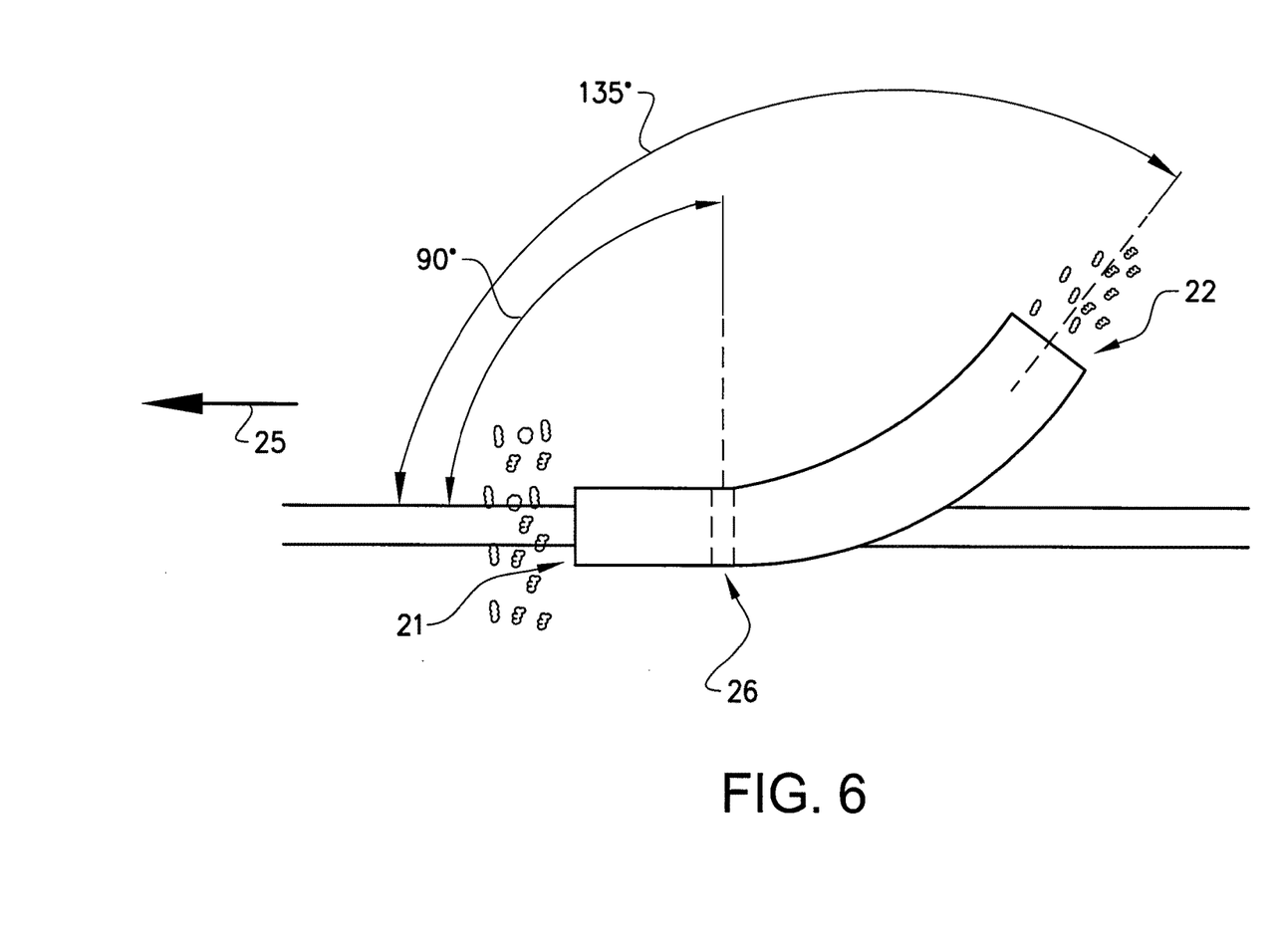
FIG. 6 shows a top view of the second embodiment of a particle removing arrangement according to the invention.

FIGS. 4, 5 and 6 show different developments of a second embodiment of a particle removing arrangement according to the invention. Only one of the particle removing arrangements is described. In this embodiment, the particle removing airflow is based on a suction airflow principle, where the particle removing arrangement is shaped as an ejector 20. In FIG. 4, a first example of the second embodiment of a particle removing, arrangement is shown. The ejector 20 comprises a particle inlet 26 positioned above the upper contact surface of the electric rail. The particle removing arrangement is provided with an inlet opening 21 directed forwards and an outlet opening 22 directed sideways to rearwards, i. e. in a direction between 90 and 180 degrees in relation to the driving direction of the vehicle. An arrow 25 shows the driving direction of the vehicle. Outer walls 23 delimit the flow channel 24 of the particle removing arrangement.

In this way, dirt will be sucked from the tipper surface of the electric rail by the particle inlet 26, functioning with an ejector effect. The flow channel 24 of the particle removing arrangement preferably comprises an area reduction 27 of the flow channel at the particle inlet 26 in order to increase the ejector effect. In this embodiment, the area of the inlet opening 21 is substantially the same as the area of the outlet opening 22. In this way, the energy loss through the particle removing arrangement will be minimized. The inlet opening may also be somewhat larger than the outlet opening.

The inlet opening is directed forwards such that the airflow created by the travelling vehicle enters the inlet opening straight. The inlet opening is preferably positioned at the front of the vehicle, e. g. underneath the front bumper or may be integrated in e. g. a wheel house. The efficiency of the particle removing arrangement is enhanced if the incoming airflow is undisturbed.

The outlet opening 22 may be directed in a sideway direction or in a rearward direction. A preferred sideway angle with respect to the driving direction is between 90 and 135 degrees, i. e. perpendicular to the electric rail or up to 45 degrees to the rear from this direction. An example is shown in FIG. 6, where the inlet opening is directed forwards with the particle inlet opening 26 positioned above the rail, and with the outlet opening directed 135 degrees sideways relative the travelling direction of the vehicle. In this way, the dirt will blow out through the outlet opening in a direction away from the upper surface of the electric rail. The outlet opening may also be offset sideways, in a direction perpendicular to the travelling direction of the vehicle, such that the outlet opening is positioned at the side of the upper contact surface of the electric rail. in this example, the outlet direction of the outlet opening may be directed by 180 degrees from the travelling direction of the vehicle, i. e. rearwards, since the dirt will blow out on the side of the electric rail.

The particle inlet 26 is arranged in the lower wall of the ejector. Preferably, the particle inlet is positioned in the forward part of the ejector. The size of the particle inlet may vary, but the area of the particle inlet is preferably smaller than the area of the inlet opening. In FIG. 4, one example of an ejector 20 is shown. In this example, the particle inlet 26 is arranged at one end of a second flow channel 30 which leads the particles to the main flow channel 24. The airflow from the inlet opening first enters a contraction section 27 in which the velocity of the air flow increases. The airflow then enters into a low pressure section 28 in which the cross-section is the smallest in the flow channel. Here, the static pressure reaches its minimum value. This effect is used to suck up particles from the upper surface of the electric rail through the particle inlet and through the second flow channel 30. The air flow and the sucked-in particles then enter a pressure recovery section 29 where the airflow speed is reduced to substantially the speed at the inlet opening.

In FIG. 5, a further example of an ejector is shown. In this example, the particle inlet is arranged in the lower wall of the ejector and enters directly into the low pressure section. In this example, the particles must not pass through a second flow channel. The size and shape of the particle inlet, and the size and shape of a second flow channel, when present, may be varied depending e. g. on the types of particles that is to be removed.

The shape and size of the particle removing arrangement may vary. The material of the particle removing arrangement may be plastic, metal or rubber or a combination of more than one material. The particle removing arrangement may be stiff and rigid, or may be somewhat flexible and may also be foldable such that it will fold together when not in use. Some of the airflow restricting surfaces in the particle removing arrangement could even be the road surface.

The invention is not to be regarded as being limited to the embodiments described above, a number of additional variants and modifications being possible within the scope of the subsequent patent claims.

REFERENCE SIGNS

1: Vehicle
2: Road
3: Electric rail
4: Electric rail
7: Current collector
8: Current collector
9: Particle removing arrangement
10: Funnel
11: Inlet Opening
12: Outlet opening
13: Wall
14: Flow channel
15: Driving direction
20: Funnel
21: Inlet opening
22: Outlet opening
23: Wall
24: Flow channel
25: Driving direction
26: Particle inlet
27: Contraction section
28: Low pressure section
29: Pressure recovery section
30: Second how channel

The invention claimed is:

1. A particle removing arrangement adapted to remove particles from the upper contact surface of an electric rail comprised in an electric highway by the use of an airflow, where the particle removing arrangement is arranged in front of a current collector of a vehicle, where the particle removing arrangement comprises an inlet opening for inlet of air and an outlet opening for outlet of air, wherein the inlet opening is directed in a forward direction and the outlet opening is directed in a sideway to rearward direction in relation to the driving direction of the vehicle, and where the particle removing arrangement creates a particle removing airflow from a forward movement of the vehicle, wherein the particle removing arrangement has a first low, active position where the particle removing arrangement is positioned adjacent the upper contact surface of the electric rail and a second idle position where the particle removing arrangement is positioned above the first position.

2. A particle removing arrangement according to claim 1, wherein the particle removing arrangement is adapted to remove particles from an upper contact surface of the electric rail that is aligned with or is positioned above the adjacent road surface.

3. A particle removing arrangement according to claim 1, wherein the particle removing arrangement is adapted to remove particles from an upper contact surface of the electric rail that is substantially horizontal and flat.

4. A particle removing arrangement according to claim 1, wherein the particle removing arrangement is an ejector.

5. A particle removing arrangement according to claim 4, wherein the particle removing airflow is a suction airflow, where the particle removing arrangement comprises a particle inlet adapted to be positioned above the upper contact surface of the electric rail.

6. A particle removing arrangement according to claim 4, wherein the outlet air flow from the outlet opening is directed in a direction that is between 90 and 180 degrees to the driving direction of the vehicle.

7. A particle removing arrangement adapted to remove particles from the upper contact surface of an electric rail comprised in an electric highway by the use of an airflow, where the particle removing arrangement is arranged in front of a current collector of a vehicle, where the particle removing arrangement comprises an inlet opening for inlet of air and an outlet opening for outlet of air, wherein the inlet opening is directed in a forward direction and the outlet opening is directed in a sideway to rearward direction in relation to the driving direction of the vehicle, and where the particle removing arrangement creates a particle removing airflow from a forward movement of the vehicle, wherein the particle removing arrangement is shaped as a funnel.

8. A particle removing arrangement according to claim 7, wherein the particle removing airflow is a blowing airflow, which is directed towards the upper contact surface of the electric rail.

9. A particle removing arrangement according to claim 8, wherein the outlet air flow from the outlet opening is directed in a direction that is between 90 and 135 degrees to the driving direction of the vehicle.

10. A particle removing arrangement according to claim 7, wherein the area of the inlet opening is at least four times larger than the area of the outlet opening.

11. A particle removing arrangement according to claim 7, wherein the outlet air flow is further directed downwards.

12. A particle removing arrangement according to claim 11, wherein the outlet air flow is directed downwards from a horizontal plane with an angle between 10 and 45 degrees.

13. A particle removing arrangement adapted to remove particles from the upper contact surface of an electric rail comprised in an electric highway by the use of an airflow, where the particle removing arrangement is arranged in front of a current collector of a vehicle, where the particle removing arrangement comprises an inlet opening for inlet of air and an outlet opening for outlet of air, wherein the inlet opening is directed in a forward direction and the outlet opening is directed in a sideway to rearward direction in relation to the driving direction of the vehicle, where the particle removing arrangement creates a particle removing airflow from a forward movement of the vehicle, wherein the particle removing arrangement is an ejector, and wherein the outlet opening is offset in a sideway direction with regards to the particle inlet.

14. A particle removing arrangement adapted to remove particles from the upper contact surface of an electric rail comprised in an electric highway by the use of an airflow, where the particle removing arrangement is arranged in front of a current collector of a vehicle, where the particle removing arrangement comprises an inlet opening for inlet of air and an outlet opening for outlet of air, wherein the inlet opening is directed in a forward direction and the outlet opening is directed in a sideway to rearward direction in relation to the driving direction of the vehicle, where the particle removing arrangement creates a particle removing airflow from a forward movement of the vehicle, wherein the particle removing arrangement is an ejector, and wherein the area of the inlet opening is the same as the area of the outlet opening.

15. A particle removing arrangement adapted to remove particles from the upper contact surface of an electric rail comprised in an electric highway by the use of an airflow, where the particle removing arrangement is arranged in front of a current collector of a vehicle, where the particle removing arrangement comprises an inlet opening for inlet of air and an outlet opening for outlet of air, wherein the inlet opening is directed in a forward direction and the outlet opening is directed in a sideway to rearward direction in relation to the driving direction of the vehicle, where the particle removing arrangement creates a particle removing airflow from a forward movement of the vehicle, wherein the particle removing arrangement is an ejector, and wherein the flow channel of the particle removing arrangement comprises a low pressure section in the flow channel at the particle inlet.

16. A particle removing arrangement adapted to remove particles from the upper contact surface of an electric rail comprised in an electric highway by the use of an airflow, where the particle removing arrangement is arranged in front of a current collector of a vehicle, where the particle removing arrangement comprises an inlet opening for inlet of air and an outlet opening for outlet of air, wherein the inlet opening is directed in a forward direction and the outlet opening is directed in a sideway to rearward direction in relation to the driving direction of the vehicle, where the particle removing arrangement creates a particle removing airflow from a forward movement of the vehicle, wherein the particle removing arrangement is an ejector, and wherein the particle removing arrangement comprises a second flow channel arranged between the particle inlet and the low pressure section.

* * * * *